(12) United States Patent
Jin et al.

(10) Patent No.: US 9,475,928 B2
(45) Date of Patent: Oct. 25, 2016

(54) REINFORCED POLYPROPYLENE COMPOSITION

(71) Applicant: Dow Global Technologies LLC, Midland, MI (US)

(72) Inventors: Yi Jin, Missouri City, TX (US); Xuming X. Chen, Pearland, TX (US); Kim L. Walton, Lake Jackson, TX (US); Gary R. Marchand, Gonzales, LA (US); Jeffrey D. Weinhold, Lake Jackson, TX (US); Sylvie Vervoort, Ghent (BE)

(73) Assignee: Dow Global Technologies LLC, Midland, MI (US)

( * ) Notice: Subject to any disclaimer, the term of this patent is extended or adjusted under 35 U.S.C. 154(b) by 363 days.

(21) Appl. No.: 14/145,072

(22) Filed: Dec. 31, 2013

(65) Prior Publication Data

US 2014/0378601 A1 Dec. 25, 2014

Related U.S. Application Data

(63) Continuation-in-part of application No. PCT/US2013/047267, filed on Jun. 24, 2013.

(51) Int. Cl.
*C08L 23/12* (2006.01)
(52) U.S. Cl.
CPC .......... *C08L 23/12* (2013.01); *C08L 2203/202* (2013.01)
(58) Field of Classification Search
CPC ................................. C08L 23/12; C08L 53/00
See application file for complete search history.

(56) References Cited

U.S. PATENT DOCUMENTS

| 5,118,753 | A | 6/1992 | Hikasa et al. |
|---|---|---|---|
| 5,272,236 | A | 12/1993 | Lai et al. |
| 5,278,272 | A | 1/1994 | Lai et al. |
| 5,681,897 | A | 10/1997 | Silvis et al. |
| 5,688,866 | A | 11/1997 | Silvis et al. |
| 5,804,660 | A | 9/1998 | Whetten et al. |
| 5,986,028 | A | 11/1999 | Lai et al. |
| 6,376,623 | B1 | 4/2002 | Hoenig et al. |
| 6,528,136 | B1 | 3/2003 | Ho et al. |
| 6,680,361 | B1 | 1/2004 | Cady et al. |
| 2005/0070673 | A1* | 3/2005 | Novak ................. B29C 51/002 525/333.9 |
| 2005/0176892 | A1 | 8/2005 | Weaver et al. |
| 2010/0240818 | A1* | 9/2010 | Walton ................... C08L 23/06 524/505 |
| 2011/0082249 | A1* | 4/2011 | Shan .................. C08F 297/083 524/505 |

FOREIGN PATENT DOCUMENTS

WO 2011/041696 A1 4/2011

OTHER PUBLICATIONS

Williams et al., J. Polym. Sci., Polym. Let., 6, pp. 621-624 (1968).

* cited by examiner

*Primary Examiner* — Peter D Mulcahy
(74) *Attorney, Agent, or Firm* — Husch Blackwell LLP

(57) ABSTRACT

The present disclosure provides a composition comprising:
a) a polypropylene;
b) a polyolefin elastomer; and
c) a block composite.
The polyolefin elastomer has an $I_{10}/I_2$ from greater than 7.5 to 15.0. The composition may optionally include a filler.

17 Claims, 4 Drawing Sheets

Figure 1: 20 μm AFM images of ENGAGE™ 8100 (comparative samples 1-4) and BSA1.1 (Comparative Sample 5, Examples 1-3) dispersed in PP blends at different active BC contents.

Figure 2: Effect of BC content on impact strength at different temperatures (BC is active-BC)

Figure 3: 20 µm AFM imagines of ENGAGE™ 8200 (Comparative Samples 5-6) and BSA7.6 (Comparative Sample 7, Example 5) dispersed in PP blends at 0 wt % active-BC and 5 wt % active-BC content.

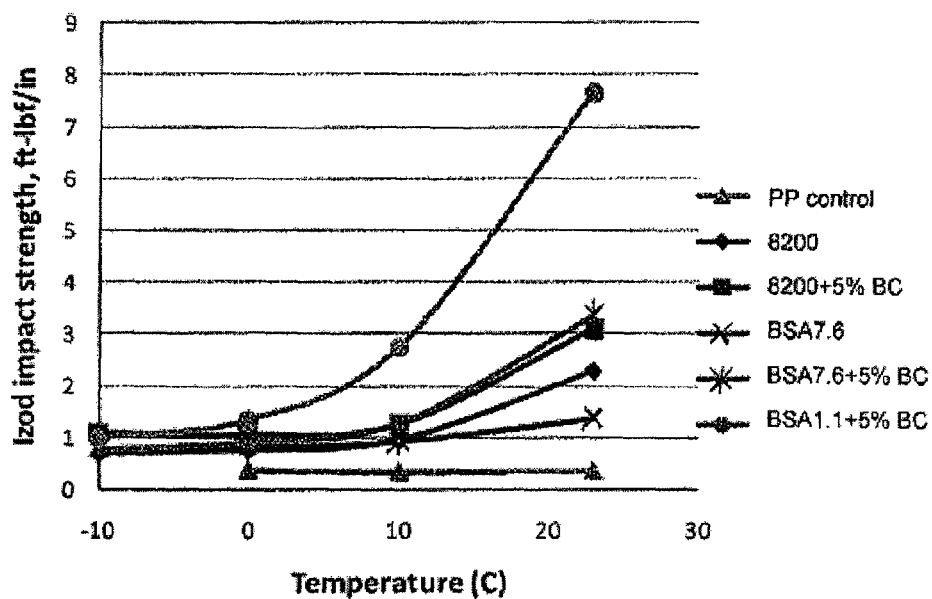
Figure 4: Effect of BC content on impact strength at different temperatures (BC is active-BC)

REINFORCED POLYPROPYLENE COMPOSITION

PRIORITY

This application claims priority to PCT/US2013/047267 filed on 24 Jun. 2013, the entire content of which is incorporated by reference herein.

FIELD

The present disclosure relates to a reinforced polypropylene composition comprising an elastomer and a block composite.

BACKGROUND

Many different polymers and materials have been added to polymer compositions in attempting to enhance the composition's impact strength or maintain the impact strength while enhancing other properties. For example, U.S. Pat. No. 5,118,753 (Hikasa et al.), incorporated herein by reference, discloses thermoplastic elastomer compositions said to have low hardness and excellent flexibility and mechanical properties consisting essentially of a mixture of an oil-extended olefinic copolymer rubber and an olefinic plastic. The olefinic plastic is polypropylene or a copolymer of polypropylene and an alpha-olefin of two or more carbon atoms. Modern Plastics Encyclopedia/89, mid October 1988 Issue, Volume 65, Number 11, pp. 110-117, the disclosure of which is incorporated herein by reference, also discusses the use of various thermoplastic elastomers (TPEs) useful for impact modification. These include: elastomeric alloys TPEs, engineering TPEs, olefinic TPEs (also known as thermoplastic olefins or TPOs), polyurethane TPEs and styrenic TPEs.

Thermoplastic olefins (TPOs) are often produced from blends of an elastomeric material such as ethylene based random copolymers, ethylene/propylene rubber (EPM) or ethylene/propylene diene monomer terpolymer (EPDM) and a more rigid material such as isotactic polypropylene. Other materials or components can be added into the formulation depending upon the application, including oil, fillers, and cross-linking agents. TPOs are often characterized by a balance of stiffness (modulus) and low temperature impact, good chemical resistance and broad use temperatures. Because of features such as these, TPOs are used in many applications, including automotive facia and wire and cable components, rigid packaging, molded articles, instrument panels, and the like.

Polypropylene (PP) homopolymers or PP random copolymers provide the desirable stiffness and clarity for many applications, but can suffer from poor impact properties due to a high Tg (0° C. for homopolymer PP, hPP). To overcome this deficiency, PP homopolymer is blended with PP copolymers and/or elastomers to improve its toughness, but often at the expense of its clarity and modulus.

Ideally the elastomer or compatibilizer should promote or produce elastomer particles that are small enough scale such that a minimum volume is needed to improve the impact performance without adversely affecting the modulus of the blend.

An additional improvement would be to develop an elastomer that improves the impact performance without adversely affecting its clarity or other preferred properties.

Ideally, the modulus and clarity of the PP/propylene-containing elastomer blend product should be comparable to that of PP homopolymer.

SUMMARY

The present disclosure provides a composition comprising:
a) a polypropylene;
b) a polyolefin elastomer; and
c) a block composite.

The polyolefin elastomer has an $I_{10}/I_2$ from greater than 7.5 to 15.0. The composition may optionally include a filler.

BRIEF DESCRIPTION OF THE DRAWINGS

FIG. 4 is a graph showing the effect of active-block composite content on impact strength at different temperatures in accordance with embodiments of the present disclosure.

DETAILED DESCRIPTION

Figure 1:
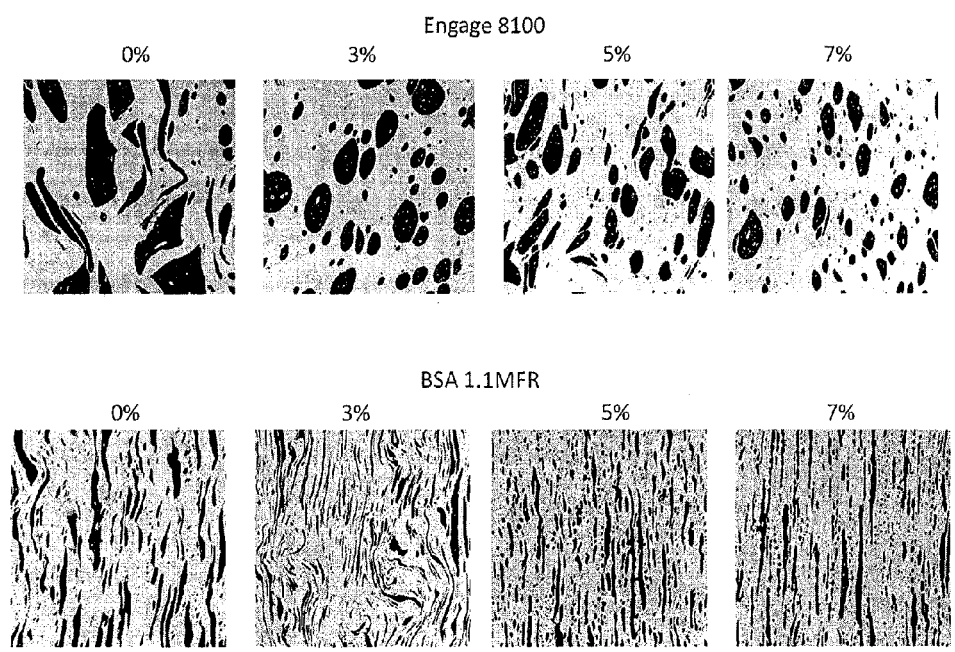
FIG. 1 shows Atomic Force Microscopy (AFM) images comparing ENGAGE™ 8100 and BSA1.1, each dispersed in respective polypropylene blends at different active-block composite content, in accordance with embodiments of the present disclosure.
Figure 2:
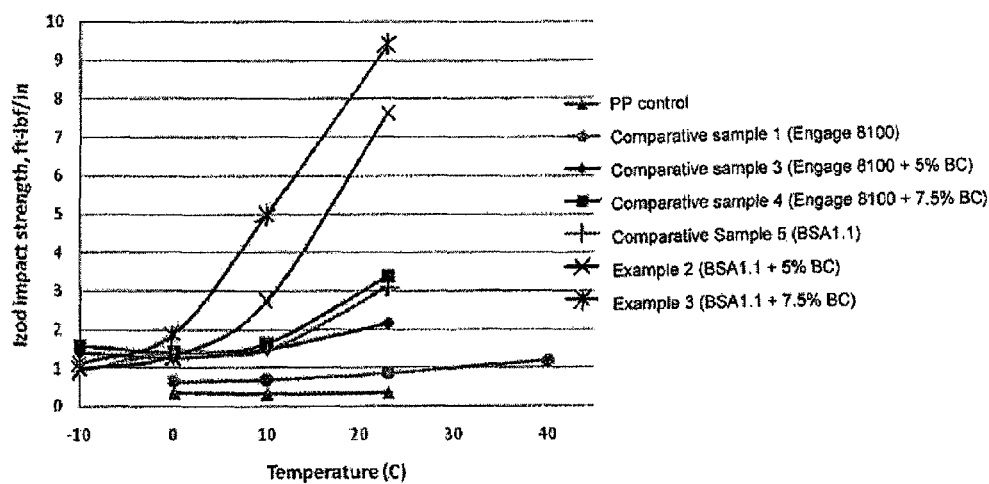
FIG. 2 is a graph showing the effect of active-block composite content on impact strength at different temperatures in accordance with embodiments of the present disclosure.
Figure 3:
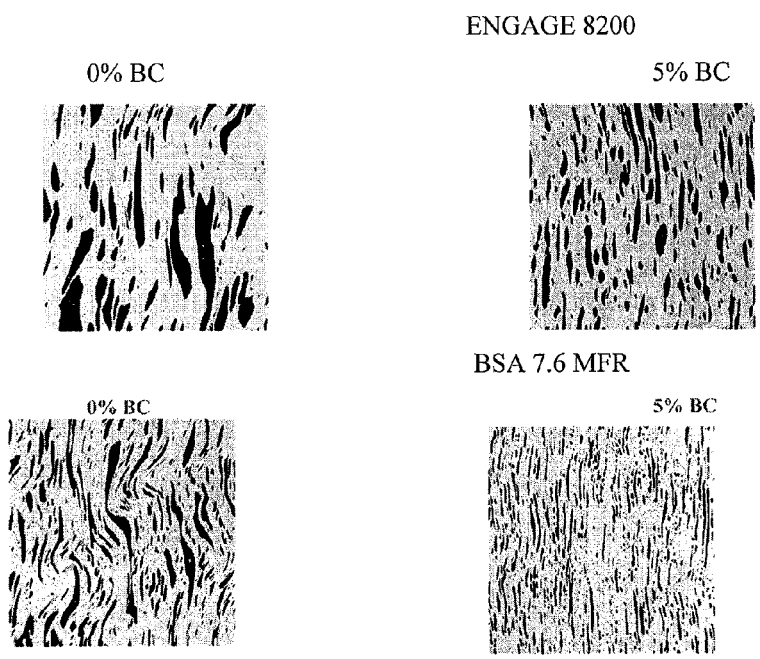
FIG. 3 shows AFM images comparing ENGAGE™ 8200 and BSA7.6, each dispersed in respective polypropylene blends at different active-block composite content, in accordance with an embodiment of the present disclosure.

The present disclosure provides a composition. In an embodiment, the composition includes:
a) from 50 wt % to 95 wt % polypropylene (PP);
b) from 3 wt % to 48 wt % of a polyolefin elastomer (POE) having an $I_{10}/I_2$ from greater than 7.5 to 15.0; and
c) from 2 wt % to 15 wt % of a block composite (BC). The block composite is a compatibilizer for PP and POE blend.

A. Polypropylene

Impact modified compositions comprise a matrix polymer toughened via blending with an elastomer composition. In one embodiment, the matrix polymer is a polypropylene. Any polypropylene known to a person of ordinary skill in the art may be used to prepare the polymer blends disclosed herein. Non-limiting examples of polypropylene include low density polypropylene (LDPP), high density polypropylene (HDPP), high melt strength polypropylene (HMS-PP), high impact polypropylene (HIPP), isotactic polypropylene (iPP), syndiotactic polypropylene (sPP) and the like, and combinations thereof.

The amount of the polypropylene in the polymer blend can be from 50 wt % to 95 wt %, from 50 wt % to 90 wt %, from 60 wt % to 80 wt %, from 65 wt % to 75 wt % of the total weight of the present composition. In an embodiment, the amount of the polypropylene in the polymer blend is about 50%, 60%, 70% or 80% by total weight of the polymer blend.

The polypropylene is generally in the isotactic form of homopolymer polypropylene, although other forms of polypropylene can also be used (e.g., syndiotactic or atactic).

Polypropylene impact copolymers (e.g., those wherein a secondary copolymerization step reacting ethylene with the propylene is employed) and random copolymers (also reactor modified and usually containing 1.5-7 wt % ethylene copolymerized with the propylene), however, can also be used in the TPO formulations disclosed herein. A complete discussion of various polypropylene polymers is contained in Modern Plastics Encyclopedia/89, mid October 1988 Issue, Volume 65, Number 11, pp. 86-92, the entire disclosure of which is incorporated herein by reference. The molecular weight and hence the melt flow rate of the polypropylene for use in the present disclosure varies depending upon the application. The melt flow rate for the polypropylene useful herein is generally from about 0.1 grams/10 minutes (g/10 min) to about 200 g/10 min, preferably from about 0.5 g/10 min to about 150 g/10 min, and especially from about 4 g/10 min to about 100 g/10 min. The polypropylene can be a propylene homopolymer, or it can be a random propylene/α-olefin copolymer or even a propylene impact copolymer (heterophasic composition of a polypropylene continuous phase with a discontinuous rubber phase dispersed therein). Examples of such polypropylene polymers include—impact copolymers, Profax Ultra SG583 from LyondellBasell Polyolefins or INSPIRE 114 from Braskem; homopolymer, H110N or D221.00, from Braskem; random copolymer, 6D43 from Braskem; random propylene-ethylene plastomers and elastomers such as VISTAMAXX™ (made by ExxonMobil), and VERSIFY™ (from The Dow Chemical Co.).

In an embodiment, the polypropylene has one, some, or all of the following properties:
(i) isotactic propylene homopolymer; and
(ii) a melt flow rate from 0.1 g/10 min, or 0.5 g/10 min, or 1.0 g/10 min, or 2.5 g/10 min to 3.0 g/10 min, or 4.0 g/10 min, or 5.0 g/10 min, or 10.0 g/10 min, or 50 g/10 min, or 75 g/10 min, or 100 g/10 min.

B. Polyolefin Elastomer

The present composition includes a polyolefin elastomer (POE) with an $I_{10}/I_2$ value from greater than 7.5 to 15.0 The polyolefin elastomer (POE) is an ethylene/$C_{3-20}$ α-olefin copolymer wherein the α-olefin is preferably a $C_{3-20}$ linear, branched or cyclic α-olefin. Examples of $C_{3-20}$ α-olefins include propene, 1-butene, 4-methyl-1-pentene, 1-hexene, 1-octene, 1-decene, 1-dodecene, 1-tetradecene, 1-hexadecene, and 1-octadecene. The α-olefins can also contain a cyclic structure such as cyclohexane or cyclopentane, resulting in an α-olefin such as 3-cyclohexyl-1-propene (allyl cyclohexane) and vinyl cyclohexane. Although not α-olefins in the classical sense of the term, for purposes of this disclosure certain cyclic olefins, such as norbornene and related olefins, are α-olefins and can be used in place of some or all of the α-olefins described above. Similarly, styrene and its related olefins (for example, α-methylstyrene, etc.) are α-olefins for purposes of this disclosure. Illustrative ethylene/alpha-olefin copolymers include ethylene/propylene, ethylene/butene, ethylene/1-hexene, ethylene/1-octene, ethylene/styrene, and the like. Illustrative terpolymers include ethylene/propylene/1-octene, ethylene/propylene/butene, ethylene/butene/1-octene, and ethylene/butene/styrene.

More specific examples of suitable polyolefin elastomers useful in this disclosure include homogeneously branched, linear ethylene/α-olefin copolymers (e.g. TAFMER® by Mitsui Petrochemicals Company Limited and EXACT® by Exxon Chemical Company), and the homogeneously branched, substantially linear ethylene/α-olefin polymers (e.g., AFFINITY™ and ENGAGE™ polyethylene available from The Dow Chemical Company). The substantially linear ethylene copolymers are especially preferred, and are more fully described in U.S. Pat. Nos. 5,272,236, 5,278,272 and 5,986,028. Blends of any of these interpolymers can also be used in the practice of this disclosure.

The amount of POE is from 3 wt % to 48 wt %, from 10 wt % to 30 wt %, from 20 wt % to 25 wt % of the total weight of the present composition.

In an embodiment, the POE is a coupled-POE produced by reacting a base POE with a coupling agent. The base POE has an $I_{10}/I_2$ value from 9 to 100, or 9 to 50, or 10 to 20 where $I_{10}$ is melt index measured by ASTM D 1238, Condition 190° C., 10 kg and $I_2$ is melt index measured by ASTM D 1238, Condition 190° C., 2.16 kg. Preferably the $I_2$ is 0.5 to 5.0 g/10 min. The coupled POE elastomer has an $I_{10}/I_2$ value from greater than 7.5 to 15.0.

In an embodiment, the base POE is reacted with a coupling agent such as a poly(sulfonyl azide), more preferably a bis(sulfonyl azide) to form a BSA coupled POE (or "BSA-POE"). Examples of poly(sulfonyl azides) useful are described in WO 99/10424. Poly(sulfonyl)azides include such compounds as 1,5-pentane bis(sulfonyl azide), 1,8-octane bis(sulfonyl azide), 1,10-decane bis(sulfonyl azide), 1,10-octadecane bis(sulfonyl azide), 1-octyl-2,4,6-benzene tris(sulfonyl azide), 4,4'-diphenyl ether bis(sulfonyl azide), 1,6-bis(4'-sulfonazidophenyl)hexane, 2,7-naphthalene bis (sulfonyl azide), and mixed sulfonyl azides of chlorinated aliphatic hydrocarbons containing an average of from 1 to 8 chlorine atoms and from 2 to 5 sulfonyl azide groups per molecule, and mixtures thereof. Preferred poly(sulfonyl azide)s include oxy-bis(4-sulfonylazidobenzene), 2,7-naphthalene bis(sulfonyl azido), 4,4'-bis(sulfonyl azido)biphenyl, 4,4'-diphenyl ether bis(sulfonyl azide) and bis(4-sulfonyl azidophenyl)methane, and mixtures thereof.

Sulfonyl azides are commercially available or are conveniently prepared by the reaction of sodium azide with the corresponding sulfonyl chloride, although oxidation of sulfonyl hydrazines with various reagents (nitrous acid, dinitrogen tetroxide, nitrosonium tetrafluoroborate) has been used.

When a bis(sulfonyl azide) (or "BSA") is used for the coupling agent, preferably at least about 100 ppm of azide is used for coupling the POE, based on the total weight of the POE, more preferably at least about 150 ppm of azide, most preferably at least about 200 ppm of azide is used. In some instances, such as where a large reduction in the ductile-to-brittle transition temperature is desirable as compared with the base comparable non-coupled POE, at least about 300 ppm of bis(sulfonyl azide), preferably at least about 450 ppm of bis(sulfonyl azide) based on the total weight of the POE is used for coupling the POE. It is important in choosing the POE to be coupled, that a polymer is chosen that has a high enough melt flow rate, so that after coupling with the desired amount of coupling agent, the coupled POE has a sufficiently high melt flow rate to be readily processed.

The BSA-POE has a density less than 0.90 g/cc. Preferably the density is from 0.855 g/cc to less than 0.900 g/cc, more preferably from 0.860 g/cc to 0.880 g/cc, or from 0.860 g/cc to 0.877 g/cc.

In an embodiment, the BSA-POE is a BSA-coupled ethylene/$C_{3-20}$ α-olefin copolymer having one, some, or all of the following properties:
(i) a density from 0.855 g/cc, or 0.860 g/cc, or 0.877 g/cc to 0.880 g/cc, or less than 0.900 g/cc;
(ii) an $I_2$ from 1.0, or 1.5, or 2.0, or 3.0 or 3.5 to 4.0, or 5.0 or 6.0;

(iii) an $I_{10}$ from 10.0, or 14.0, or 20.0, or 30.0, or 40.0, to 50.0, or 58.0 or, 60.0; and (iv) an $I_{10}/I_2$ from 8.0, or 8.5, or 9.0, or 10.0, or 11.0 to 12.0, or 12.4, or 13.0, or 14.0, or 15.0.

In an embodiment, the BSA-POE is a BSA-coupled ethylene/octene copolymer having one, some, or all of the foregoing, properties (i)-(iv) above.

C. Block Composite Compatibilizer

The term "block copolymer" or "segmented copolymer" refers to a polymer comprising two or more chemically distinct regions or segments (referred to as "blocks") joined in a linear manner, that is, a polymer comprising chemically differentiated units which are joined (covalently bonded) end-to-end with respect to polymerized functionality, rather than in pendent or grafted fashion. In a preferred embodiment, the blocks differ in the amount or type of comonomer incorporated therein, the density, the amount of crystallinity, the type of crystallinity (e.g. polyethylene versus polypropylene), the crystallite size attributable to a polymer of such composition, the type or degree of tacticity (isotactic or syndiotactic), regio-regularity or regio-irregularity, the amount of branching, including long chain branching or hyper-branching, the homogeneity, or any other chemical or physical property. The block copolymers of the disclosure are characterized by unique distributions of both polymer polydispersity (PDI or Mw/Mn) and block length distribution, due, in a preferred embodiment, to the effect of a shuttling agent(s) in combination with the catalyst(s).

The term "block composite" refers to polymers comprising a soft copolymer, polymerized units in which the comonomer content is greater than 10 mol % and less than 90 mol % and preferably greater than 20 mol % and less than 80 mol %, and most preferably greater than 33 mol % and less than 75 mol %, a hard polymer, in which the monomer is present in an amount greater than 90 mol percent, and preferably greater than 93 mol percent, and more preferably greater than 95 mol percent, and most preferably greater than 98 mol percent and a block copolymer, preferably a diblock, having a soft segment and a hard segment, wherein the hard segment of the block copolymer is essentially the same composition as the hard polymer in the block composite and the soft segment of the block copolymer is essentially the same composition as the soft copolymer of the block composite. The block copolymers can be linear or branched. More specifically, when produced in a continuous process, the block composites desirably possess PDI from 1.7 to 15, preferably from 1.8 to 3.5, more preferably from 1.8 to 2.2, and most preferably from 1.8 to 2.1. When produced in a batch or semi-batch process, the block composites desirably possess PDI from 1.0 to 2.9, preferably from 1.3 to 2.5, more preferably from 1.4 to 2.0, and most preferably from 1.4 to 1.8. Such block composites are described in, for example, US Patent Application Publication Nos US2011-0082257, US2011-0082258 and US2011-0082249, all published on Apr. 7, 2011 and incorporated herein by reference with respect to descriptions of the block composites, processes to make them and methods of analyzing them.

"Hard" segments refer to highly crystalline blocks of polymerized units in which the monomer is present in an amount greater than 90 mol percent, and preferably greater than 93 mol percent, and more preferably greater than 95 mol percent, and most preferably greater than 98 mol percent. In other words, the comonomer content in the hard segments is most preferably less than 2 mol percent, and more preferably less than 5 mol percent, and preferably less than 7 mol percent, and less than 10 mol percent. In some embodiments, the hard segments comprise all or substantially all propylene units. "Soft" segments, on the other hand, refer to amorphous, substantially amorphous or elastomeric blocks of polymerized units in which the comonomer content is greater than 10 mol % and less than 90 mol % and preferably greater than 20 mol % and less than 80 mol %, and most preferably greater than 33 mol % and less than 75 mol %.

The block composite and crystalline block composite polymers are preferably prepared by a process comprising contacting an addition polymerizable monomer or mixture of monomers under addition polymerization conditions with a composition comprising at least one addition polymerization catalyst, a cocatalyst and a chain shuttling agent, said process being characterized by formation of at least some of the growing polymer chains under differentiated process conditions in two or more reactors operating under steady state polymerization conditions or in two or more zones of a reactor operating under plug flow polymerization conditions. In a preferred embodiment, the block composites of the present disclosure comprise a fraction of block polymer which possesses a most probable distribution of block lengths.

Suitable processes useful in producing the block composites and crystalline block composites may be found, for example, in US Patent Application Publication No. 2008/0269412, published on Oct. 30, 2008, which is herein incorporated by reference. In particular, the polymerization is desirably carried out as a continuous polymerization, preferably a continuous, solution polymerization, in which catalyst components, monomers, and optionally solvent, adjuvants, scavengers, and polymerization aids are continuously supplied to one or more reactors or zones and polymer product continuously removed therefrom. Within the scope of the terms "continuous" and "continuously" as used in this context are those processes in which there are intermittent additions of reactants and removal of products at small regular or irregular intervals, so that, over time, the overall process is substantially continuous. Moreover, as previously explained, the chain shuttling agent(s) may be added at any point during the polymerization including in the first reactor or zone, at the exit or slightly before the exit of the first reactor, or between the first reactor or zone and the second or any subsequent reactor or zone. Due to the difference in monomers, temperatures, pressures or other difference in polymerization conditions between at least two of the reactors or zones connected in series, polymer segments of differing composition such as comonomer content, crystallinity, density, tacticity, regio-regularity, or other chemical or physical difference, within the same molecule are formed in the different reactors or zones. The size of each segment or block is determined by continuous polymer reaction conditions, and preferably is a most probable distribution of polymer sizes.

The amount of block composite is from 2 wt % to 15 wt %, from 3 wt % to 15 wt %, from 5 wt % to 15 wt %, from 10 wt % to 15 wt % of the total weight of the present composition.

D. Additives and Filler

The present composition may optionally include one or more additives and/or one or more fillers. Additives such as antioxidants (e.g., hindered phenolics (e.g., Irganox™ 1010), phosphites (e.g., Irgafos™ 168)), cling additives (e.g., PIB), antiblock additives, pigments, fillers (e.g., talc, diatomaceous earth, nano-fillers, clay, metal particles, glass fibers or particles, carbon black, other reinforcing fibers, etc.), and the like can also be included in the formulations.

Preferably, the compositions comprise talc in an amount of 0 wt % to 35 wt %, 1 wt % to 25 wt % and more preferably 5 wt % to 25 wt % based on total weight of polymer. Other additives may be present in amounts of from 0.01 wt % to 1 wt %.

E. Compositions

In an embodiment, the composition includes:
a) from 50 wt % to 95 wt % polypropylene;
b) from 3 wt % to 48 wt % of a polyolefin elastomer having an $I_{10}/I_2$ from greater than 7.5 to 15.0; and
c) from 2 wt % to 15 wt % of a block composite. This composition is hereafter to referred to as Composition (A).

In an embodiment, the polypropylene of Composition (A) is a propylene homopolymer having a melt flow rate from 0.1 g/10 min to 100 g/10 min.

In an embodiment, the polyolefin elastomer of Composition (A) is a coupled-polyolefin elastomer having an $I_{10}/I_2$ from greater than 7.5 to 15.0.

In an embodiment, the coupled-polyolefin elastomer of Composition (A) is a bis(sulfonyl azide) coupled polyolefin elastomer.

In an embodiment, Composition (A) includes a filler.

In an embodiment, the present composition includes
a) from 65 wt % to 75 wt % propylene homopolymer;
b) from 20 wt % to 25 wt % of a bis(sulfonyl azide) coupled polyolefin elastomer having an $I_{10}/I_2$ from 8.0 to 15.0;
c) from 3 wt % to 15 wt % of the block composite; and
the composition has an Izod dart impact strength from 350 J/m to 550 J/m at 23° C. as measured in accordance with ASTM 256-10. This composition is hereafter referred to as Composition (B).

In an embodiment, the bis(sulfonyl azide) coupled polyolefin elastomer of Composition (B) has an $I_{10}/I_2$ from 8.0 to 15.0.

In an embodiment, Composition (B) has a haze value from 55% to 70%.

In an embodiment, Composition (B) has a flexural modulus from 1000 to 2000 MPa.

In an embodiment, the bis(sulfonyl azide) coupled polyolefin elastomer of Composition (B) has an $I_{10}/I_2$ of 12.4.

In an embodiment, Composition (B) includes a filler.

In an embodiment, the present composition includes:
a) from 65 wt % to 75 wt % propylene homopolymer;
b) from 20 wt % to 25 wt % of a bis(sulfonyl azide) coupled polyolefin elastomer having an $I_{10}/I_2$ from 8.0 to less than 10.0;
c) from 3 wt % to 15 wt % of the block composite; and
the composition has an Izod dart impact strength from 100 J/m to 200 J/m at 23° C. as measured in accordance with ASTM 256-10. The composition is hereafter referred to as Composition (C).

In an embodiment, the polyolefin elastomer of Composition (C) is a bis(sulfonyl azide) coupled polyolefin elastomer having an $I_{10}/I_2$ of 8.5.

In an embodiment, Composition (C) has a haze value from 55% to 70%.

In an embodiment, Composition (C) has a flexural modulus from 900 MPa to less than 1000 MPa.

In an embodiment, Composition (C) includes a filler.

F. Applications and End-Uses

Useful fabricated articles or parts can be made from the formulations disclosed herein, using various processes, including various injection molding processes (e.g., that described in Modern Plastics Encyclopedia/89, Mid October 1988 Issue, Volume 65, Number 11, pp. 264-268, "Introduction to Injection Molding" and on pp. 270-271, "Injection Molding Thermoplastics", the disclosures of which are incorporated herein by reference) and blow molding processes (e.g., that described in Modern Plastics Encyclopedia/89, Mid October 1988 Issue, Volume 65, Number 11, pp. 217-218, "Extrusion-Blow Molding", the disclosure of which is incorporated herein by reference) and profile extrusion. Some of the fabricated articles include fuel tanks, outdoor furniture, pipes, automotive container applications, automotive bumpers, facia, wheel covers and grilles, as well as other household and personal articles, including, for example, freezer containers. Of course, one skilled in the art can also combine polymers to advantageously use refractive index to improve, or maintain clarity of end use articles, such as freezer containers.

Test Methods

The numerical figures and ranges here are approximate, and thus may include values outside of the range unless otherwise indicated. Numerical ranges (e.g., as "X to Y", or "X or more" or "Y or less") include all values from and including the lower and the upper values, in increments of one unit, provided that there is a separation of at least two units between any lower value and any higher value. As an example, if a compositional, physical or other property, such as, for example, temperature, is from 100 to 1,000, then all individual values, such as 100, 101, 102, etc., and sub ranges, such as 100 to 144, 155 to 170, 197 to 200, etc., are expressly enumerated. For ranges containing values which are less than one or containing fractional numbers greater than one (e.g., 1.1, 1.5, etc.), one unit is considered to be 0.0001, 0.001, 0.01 or 0.1, as appropriate. For ranges containing single digit numbers less than ten (e.g., 1 to 5), one unit is typically considered to be 0.1. For ranges containing explicit values (e.g., 1 or 2, or 3 to 5, or 6, or 7) any subrange between any two explicit values is included (e.g., 1 to 2; 2 to 6; 5 to 7; 3 to 7; 5 to 6; etc.).

Density is measured in accordance with ASTM D 792.

Haze—Percent haze is measured in accordance with ASTM D 1003, using a BYK-Gardner transparency meter.

Differential scanning calorimetry (DSC) is performed on compression molded specimens using a TA Instruments Q100 or Q1000 DSC and a crimp-sealed Perkin Elmer pan. Samples are equilibrated at −90° C. for 5 min., then heated at 10° C./min. to 180° C. (capturing the "$1^{st}$ Heat DSC Curve"), held for 5 min., then cooled at 10° C./min. to −90° C. (capturing the "crystallization curve"), held for 5 minutes, then heated at 10° C./min. to 180° C. (capturing the "$2^{nd}$ Heat DSC Curve"). The data is analyzed using TA Universal Analysis software after run completion.

Melt flow rate for the polypropylene (PP) the samples is measured using ASTM D 1238, Condition 230° C., 2.16 kg. Melt Index or $I_2$ is measured using ASTM D 1238, Condition 190° C., 2.16 kg. Melt flow rate for the polyolefin elastomer (POE) samples is measured using ASTM D1238, Condition 230° C., 10 kg. Melt Index or $I_{10}$ is measured using ASTM D 1238, Condition 190° C., 10 kg.

$^{13}$C NMR Analysis—The samples are prepared by adding approximately 3 g of a 50/50 mixture of tetrachloroethane-d$^2$/orthodichlorobenzene to 0.4 g sample in a 10 mm NMR tube. The samples are dissolved and homogenized by heating the tube and its contents to 150° C. The data are collected using a JEOL Eclipse™ 400 MHz spectrometer or a Varian Unity Plus™400 MHz spectrometer, corresponding to a $^{13}$C resonance frequency of 100.5 MHz. The data are acquired using 4000 transients per data file with a 6 second pulse repetition delay. To achieve minimum signal-to-noise for quantitative analysis, multiple data files are added together.

The spectral width is 25,000 Hz with a minimum file size of 32K data points. The samples are analyzed at 130° C. in a 10 mm broad band probe. The comonomer incorporation is determined using Randall's triad method (Randall, J. C.; JMS-Rev. Macromol. Chem. Phys., C29, 201-317 (1989), which is incorporated by reference herein in its entirety.

HTLC—High Temperature Liquid Chromotography (HTLC) is performed according to the methods disclosed in US Patent Application Publication No. 2010-0093964 and U.S. patent application Ser. No. 12/643,111, filed Dec. 21, 2009, both of which are herein incorporated by reference. Samples are analyzed by the methodology described below.

A Waters GPCV2000 high temperature SEC chromatograph is reconfigured to build the HT-2DLC instrumentation. Two Shimadzu LC-20AD pumps are connected to the injector valve in GPCV2000 through a binary mixer. The first dimension (D1) HPLC column is connected between the injector and a 10-port switch valve (Valco Inc). The second dimension (D2) SEC column is connected between the 10-port valve and LS (Varian Inc.), IR (concentration and composition), RI (refractive index), and IV (intrinsic viscosity) detectors. RI and IV are built-in detector in GPCV2000. The IR5 detector is provided by PolymerChar, Valencia, Spain.

Columns: The D1 column is a high temperature Hypercarb graphite column (2.1×100 mm) purchased from Thermo Scientific. The D2 column is a PLRapid-H column purchased from Varian (10×100 mm).

Reagents: HPLC grade trichlorobenzene (TCB) is purchased from Fisher Scientific. 1-Decanol and decane are from Aldrich. 2,6-Di-tert-butyl-4-methylphenol (Ionol) is also purchased from Aldrich.

Sample Preparation: 0.01-0.15 g of polyolefin sample is placed in a 10-mL Waters autosampler vial. 7-mL of either 1-decanol or decane with 200 ppm Ionol is added to the vial afterwards. After sparging helium to the sample vial for about 1 min, the sample vial is put on a heated shaker with temperature set at 160° C. The dissolution is done by shaking the vial at the temperature for 2 hr. The vial is then transferred to the autosampler for injection. Please note that the actual volume of the solution is more than 7 mL due to the thermal expansion of the solvent.

HT-2DLC: The D1 flow rate is at 0.01 mL/min. The composition of the mobile phase is 100% of the weak eluent (1-decanol or decane) for the first 10 min of the run. The composition is then increased to 60% of strong eluent (TCB) in 489 min. The data are collected for 489 min as the duration of the raw chromatogram. The 10-port valve is switched every three minutes yielding 489/3=163 SEC chromatograms. A post-run gradient is used after the 489 min data acquisition time to clean and equilibrate the column for the next run:

Clean Step:
1. 490 min: flow=0.01 min; /Maintain the constant flow rate of 0.01 mL/min from 0-490 min.
2. 491 min: flow=0.20 min; /Increase the flow rate to 0.20 mL/min.
3. 492 min: % B=100; /Increase the mobile phase composition to 100% TCB
4. 502 min: % B=100; /Ish the column using 2 mL of TCB
Equilibrium Step:
5. 503 min: % B=0; /Change the mobile phase composition to 100% of 1-decanol or decane
6. 513 min: % B=0; /Equilibrate the column using 2 mL of weak eluent
7. 514 min: flow=0.2 mL/min; /Maintain the constant flow of 0.2 mL/min from 491-514 min
8. 515 min: flow=0.01 mL/min; /Lower the flow rate to 0.01 mL/min.

After step 8, the flow rate and mobile phase composition are the same as the initial conditions of the run gradient.

The D2 flow rate is at 2.51 mL/min. Two 60 µL loops are installed on the 10-port switch valve. 30-µL of the eluent from D1 column is loaded onto the SEC column with every switch of the valve.

The IR, LS15 (light scattering signal at 15°), LS90 (light scattering signal at 90°), and IV (intrinsic viscosity) signals are collected by EZChrom through a SS420X analogue-to-digital conversion box. The chromatograms are exported in ASCII format and imported into a home-written MATLAB software for data reduction. Using an appropriate calibration curve of polymer composition and retention volume, of polymers that are of similar nature of the hard block and soft block contained in the block composite being analyzed. Calibration polymers should be narrow in composition (both molecular weight and chemical composition) and span a reasonable molecular weight range to cover the composition of interest during the analysis. Analysis of the raw data is calculated as follows, the first dimension HPLC chromatogram is reconstructed by plotting the IR signal of every cut (from total IR SEC chromatogram of the cut) as a function of the elution volume. The IR vs. D1 elution volume is normalized by total IR signal to obtain weight fraction vs. D1 elution volume plot. The IR methyl/measure ratio is obtained from the reconstructed IR measure and IR methyl chromatograms. The ratio is converted to composition using a calibration curve of PP wt % (by NMR) vs. methyl/measure obtained from SEC experiments. The MW is obtained from the reconstructed IR measure and LS chromatograms. The ratio is converted to MW after calibration of both IR and LS detectors using a PE standard.

HT GPC—A high temperature Gel Permeation Chromatography system (GPC IR) consisting of an Infra-red concentration detector (IR-4) from PolymerChar Inc (Valencia, Spain) is used for Molecular Weight (MW) and Molecular Weight Distribution (MWD) determination. The carrier solvent is 1,2,4-trichlorobenzene (TCB). The auto-sampler compartment is operated at 160° C., and the column compartment is operated at 150° C. The columns used are four Polymer Laboratories Olexis, 13 micron columns. The chromatographic solvent (TCB) and the sample preparation solvent are from the same solvent source with 250 ppm of butylated hydroxytoluene (BHT) and nitrogen sparged. The samples are prepared at a concentration of 2 mg/mL in TCB. Polyethylene samples are gently shaken at 160° C. for 2 hours. The injection volume is 2001, and the flow rate is 1.0 ml/minute.

Calibration of the GPC column set is performed with 21 narrow molecular weight distribution polystyrene standards. The molecular weights of the standards ranged from 580 to 8,400,000 g/mol, and are arranged in 6 "cocktail" mixtures, with at least a decade of separation between individual molecular weights.

The polystyrene standard peak molecular weights are converted to polyethylene molecular weights using the following equation (as described in Williams and Ward, J. Polym. Sci., Polym. Let., 6, 621 (1968)):

$$M_{polyethylene} = A(M_{polystyrene})^B \quad (1)$$

Here B has a value of 1.0, and the experimentally determined value of A is around 0.39.

A first order polynomial is used to fit the respective polyethylene-equivalent calibration points obtained from equation (1) to their observed elution volumes of polystyrene standards.

Number, weight, and z-average molecular weights are calculated according to the following equations:

$$\overline{Mn} = \frac{\sum_{i} Wf_i}{\sum_{i}(Wf_i/M_i)} \quad (2)$$

$$\overline{Mw} = \frac{\sum_{i}(Wf_i * M_i)}{\sum_{i} Wf_i} \quad (3)$$

$$\overline{Mz} = \frac{\sum_{i}(Wf_i * M_i^2)}{\sum_{i}(Wf_i * M_i)} \quad (4)$$

Where, $Wf_i$ is the weight fraction of the i-th component and $M_i$ is the molecular weight of the i-th component.

The MWD is expressed as the ratio of the weight average molecular weight (Mw) to the number average molecular weight (Mn).

The accurate A value is determined by adjusting A value in equation (1) until Mw calculated using equation (3) and the corresponding retention volume polynomial, agreed with the known Mw value of 115,000 g/mol of a standard linear polyethylene homopolymer reference.

Izod Impact Tests—The notched Izod impact tests are done on injection molded ASTM specimens cut from tensile bars to have the dimensions of 62 mm×19 mm×3.175 mm. The samples are notched using a notcher to produce a notch depth 10.16±0.05 mm according to ASTM D256. Five specimens of each sample are tested using ASTM D256 at 23° C. Where the energy value in J/m is reported.

Flexural Modulus—The flexural modulus test is performed according to ISO 178 at 2 mm per minute utilizing a span of 2.5 inches on a 5 station United flex frame, after conditioning for 40 hours at 73° F. and 50% relative humidity. Chord modulus is reported utilizing the stress values at 0.5 and 0.25% strain. The average and standard deviation are reported.

Atomic force microscopy (AFM)—Area Weighted Average Diameter (Da) (microns) measurement—Compression molded plaques of each blend are used for AFM imaging. A small portion of the compression molded plaque is microtomed under cryogenic conditions of −120° C. to produce a polished blockface. A Dimension 3100 DI/Veeco atomic force microscope is operated in tapping mode with phase detection. Operating software is v7.30. Tips used for all scans are MikroMasch NCS #16 with a resonant frequency of ~170 khz and a spring constant of 40 N/m. Image analysis is performed on five 60×60 mm² scans to obtain particle size distribution for each blend. The area weighted average diameter (Da):

$$D_a = \Sigma_{i=1}^{n} A_i D_i / \Sigma_{i=1}^{n} A_i$$

Where $A_i$ is the area of each particle; $D_i$ is the diameter of each particle.

Some embodiments of the present disclosure will now be described in detail in the following Examples.

EXAMPLES

1. Materials

Materials used in the present examples and in the comparative samples are provided in Table 1 below.

TABLE 1

| Components | | |
|---|---|---|
| Component | Description/Source | Properties |
| PP | Polypropylene H734-R52 (Braskem) | 52 MFR Propylene homopolymer |
| 8100 | ENGAGE ™ 8100 POE (The Dow Chemical Company) | 1.0 MI (190° C./2.16 kg, ASTM D1238); density 0.870 g/cc |
| 8200 | ENGAGE ™ 8200 POE (The Dow Chemical Company) | 5.0 MI (190° C./2.16 kg, ASTM D1238); density 0.870 g/cc |
| 8407 | ENGAGE ™ 8407 POE (The Dow Chemical Company) | 1.0 MI (190° C./2.16 kg, ASTM D1238); density 0.870 g/cc |
| BSA1.1 | BSA modified ENGAGE ™ 8407 POE (The Dow Chemical Company) | 1.1 MI (190° C./2.16 kg, ASTM D1238, density 0.870 g/cc) |
| BSA7.6 | BSA modified ENGAGE ™ 8407 POE (The Dow Chemical Company) | 6.8 MI (190° C./2.16 kg, ASTM D1238, density 0.870 g/cc) |
| BC | Block composite (The Dow Chemical Company) | 5.5 MFR 50/50 blocks, 65 wt % $C_2$ in EP block |

2. Polyolefin Elastomer (POE)

A. BSA (Azidocarbonamide) Modification of ENGAGE™ 8407 POE

BSA coupling of ENGAGE™ 8407 POE (polyolefin elastomer) is done by melt blending on a 30 mm, Coperion WP-30ZSK, co-rotating, twin-screw extruder at a speed of 100 RPM. In order to reduce the chain scission during melt blending, Molecular Melt (DPO-BSA) powder is used as the source of BSA. It has a ratio of 3.3 parts IRGANOX 1010 and 1 part BSA. 1.6 wt % of Molecular Melt is melt blended with ENGAGE™ 8407 by using the above process, resulting in BSA modified POE with MI 1.1 (BSA 1.1). 1.0 wt % of Molecular Melt is melt blended with ENGAGE™ 8407 by using the above process, resulting in BSA modified POE with MI 6.9 (BSA 7.6).

B. Properties for Uncoupled POE and BSA-Coupled POE are Shown in Table 2 Below.

TABLE 2

POE Properties - unmodified POE and BSA-POE

| Samples | Conventional GPC | | | | $I_2$, g/10 min | $I_{10}$, g/10 min | $I_{10}/I_2$ | Mass recovery 1 | Mass recovery 2 |
| --- | --- | --- | --- | --- | --- | --- | --- | --- | --- |
| | Mn | Mw | Mz | Mw/Mn | | | | | |
| BSA 1.1 (BSA modified 8407) | 23,422 | 47,077 | 76,278 | 2.01 | 1.1 | 14.0 | 12.4 | 96.4 | 95.9 |
| BSA 7.6 (BSA modified 8407) | 23,049 | 46,904 | 76,104 | 2.03 | 6.9 | 58.1 | 8.5 | 98.9 | 99.1 |
| ENGAGE ™ 8407 | 22,554 | 47,266 | 77,048 | 2.10 | 30.0 | 144.2 | 4.8 | 100.0 | 100.0 |
| ENGAGE ™ 8200 | 35,890 | 71,010 | 119,000 | 1.98 | 5.0 | 36.5 | 7.3 | / | / |
| ENGAGE ™ 8100 | 50,210 | 108,690 | 195,900 | 2.16 | 0.9 | 6.7 | 7.4 | / | / |

3. Block Composite

A. Preparation of Block Composite

Catalyst-1 ([[rel-2',2'''-[(1R,2R)-1,2-cylcohexanediylbis(methyleneoxy-κO)]bis[3-(9H-carbazol-9-yl)-5-methyl[1,1'-biphenyl]-2-olato-κO]](2-)]dimethyl-hafnium) and cocatalyst-1, a mixture of methyldi($C_{14-18}$ alkyl)ammonium salts of tetrakis(pentafluorophenyl)borate, prepared by reaction of a long chain trialkylamine (Armeen™ M2HT, available from Akzo-Nobel, Inc.), HCl and Li[B($C_6F_5$)$_4$], substantially as disclosed in U.S. Pat. No. 5,919,983, Ex. 2, are purchased from Boulder Scientific and used without further purification.

CSA-1 (diethylzinc or DEZ) and cocatalyst-2 (modified methylalumoxane (MMAO)) are purchased from Akzo Nobel and used without further purification. The solvent for the polymerization reactions is a hydrocarbon mixture (ISOPAR®E) obtainable from ExxonMobil Chemical Company and purified through beds of 13-X molecular sieves prior to use.

The block composite of the present Example is designated BC. It is prepared using two continuous stirred tank reactors (CSTR) connected in series. The first reactor is approximately 12 gallons in volume while the second reactor is approximately 26 gallons. Each reactor is hydraulically full and set to operate at steady state conditions. Monomers, solvent, hydrogen, catalyst-1, cocatalyst-1, cocatalyst-2 and CSA-1 are fed to the first reactor according to the process conditions outlined in Table 2. The first reactor contents as described in Table 2 flow to a second reactor in series. Additional monomers, solvent, hydrogen, catalyst-1, cocatalyst-1, and optionally, cocatalyst-2, are added to the second reactor.

TABLE 3

Polymerization Process Parameters for Block Composite (BC)

| Condition | 1st reactor | 2nd reactor |
| --- | --- | --- |
| Reactor Control Temp. (° C.) | 95 | 105 |
| Solvent Feed (lb/hr) | 115 | 115 |
| Propylene Feed (lb/hr) | 20.0 | 29.7 |
| Ethylene Feed (lb/hr) | 10.3 | 0 |
| Reactor Propylene Conc. (g/L) | 2.0 | 2.5 |
| Hydrogen Feed (SCCM) | 13.6 | 9.7 |
| Catalyst Efficiency (gPoly/gM) * $10^6$ | 2.5 | 0.16 |
| Catalyst Flow (lb/hr) | 0.40 | 0.98 |
| Catalyst Conc. (ppm) | 29.9 | 200 |
| Cocatalyst-1 Flow (lb/hr) | 0.54 | 0.65 |
| Cocatalyst-1 Conc. (ppm) | 300 | 3000 |
| Cocat.-2 Flow (lb/hr) | 0.75 | 0 |
| Cocat.-2 Conc. (ppm) | 2000 | 0 |
| DEZ Flow (lb/hr) | 0.80 | 0 |
| DEZ Concentration (ppm) | 30000 | 0 |

TABLE 4

Physical Properties for Block Composite

| Example | MFR (230° C./2.16 kg) | Wt % PP from HTLC Separation | Mw Kg/mol | Mw/Mn | Total Wt % $C_2$ | Tm (° C.) Peak 1 (Peak 2) | Tc (° C.) | Melt Enthalpy (J/g) |
| --- | --- | --- | --- | --- | --- | --- | --- | --- |
| BC | 5.5 | 22 | 130,020 | 4.37 | 33.5 | 138.1 (30.0) | 92.9 | 21.3 |

| Sample | Wt % iPP | Wt % EP | Wt % $C_2$ in EP | Block Composite Index |
| --- | --- | --- | --- | --- |
| BC | 49 | 51 | 65 | 0.58 |

4. Composition

A. Compounding and Injection Molding of the PP/POE/BC Samples.

Blend conditions—The compounds are prepared by melt blending on a micro 18 mm twin-screw extruder at a speed of 200 RPM. The compounding extruder rate is 7 lb/hour with a melt temperature of 220° C. (430° F.). The extruded strand is water-cooled and chopped into pellets. The formulations are listed in Table 5, PP-EP diblock, 50/50 blocks, 65 wt % $C_2$ in EP block) as compatibilizer, along with ENGAGE™ 8100 and BSA-modified POE, respectively as impact modifiers. Injection molded ASTM D-638 Type I tensile bars are obtained for mechanical testing using an Arburg 370 C injection molder.

greater flex modulus when compared to compositions with an un-modified POE component. Examples 1-3 show greater flex modulus 1034.3-1115.0 MPa when compared to the flex modulus of Comparative Samples 2-4 1006.7-1065.4 MPa.

The BC synergistically contributes to fine dispersion of BSA1.1 and BSA7.6 within the present compositions (examples 1-4). Bounded by no particular theory, it is believed (i) the BC reduces the interfacial tension between BSA-modified POE and the PP phase and (ii) strengthens the

TABLE 5

Composition properties - Particle size of various POE dispersed in PP
(POE/PP weight ratio = 25/75 for all samples)

| Sample # | PP (wt %) | POE | POE (wt %) | BC (wt %) | Active BC** (wt %) | *Da, nm | Haze % | Flex mod (MPa) | Izod impact strength@23° C. (J/m) |
|---|---|---|---|---|---|---|---|---|---|
| PP | 100 | — | — | — | — | — | 58.07 | 1714.7 | 18.8 |
| CS 1 | 75.0 | 8100 | 25.0 | 0.0 | 0 | 3133 | 95.34 | 1133.0 | 46.4 |
| CS 2 | 71.1 | 8100 | 23.7 | 5.2 | 3 | 2504 | 94.62 | 1065.4 | 90.7 |
| CS 3 | 68.5 | 8100 | 22.8 | 8.6 | 5 | 1836 | 96.04 | 1010.2 | 115.8 |
| CS 4 | 65.3 | 8100 | 21.8 | 12.9 | 7.5 | 1916 | 96.00 | 1006.7 | 180.3 |
| CS5 | 75.0 | BSA1.1 | 25.0 | 0.0 | 0 | 1648 | 53.42 | 1160.6 | 165.4 |
| Example 1 | 71.1 | BSA1.1 | 23.7 | 5.2 | 3 | 1165 | 58.50 | 1115.0 | 363.8 |
| Example 2 | 68.5 | BSA1.1 | 22.8 | 8.6 | 5 | 1025 | 53.86 | 1104.0 | 408.1 |
| Example 3 | 65.3 | BSA1.1 | 21.8 | 12.9 | 7.5 | 1119 | 66.10 | 1034.3 | 502.0 |
| CS 6 | 75 | 8200 | 25 | 0 | 0 | 2115 | 65.18 | 1119.2 | 122.2 |
| CS 7 | 68.5 | 8200 | 22.8 | 8.6 | 5 | 1388 | 70.22 | 995.7 | 164.9 |
| CS 8 | 75 | BSA7.6 | 25 | 0 | 0 | 1304 | 49.64 | 1061.9 | 73.1 |
| Example 4 | 68.5 | BSA7.6 | 22.8 | 8.6 | 5 | 766 | 56.68 | 975.0 | 179.3 |

*Particle size of POE component dispersed in PP
**Active-BC wt % = BC wt % × Block composite index (0.58)

5. Discussion

At BC load, the same Examples 1-4 of the present composition containing greater than or equal to 3.0 wt % BSA-modified POE (BSA1.1 or BSA7.6) exhibit a POE particle size (Da) that is smaller than the POE particle size for the comparative samples containing un-modified POE (ENGAGE 8100, ENGAGE 8200, ENGAGE 8407). The particle size of high shear thinning elastomer (BSA 1.1) is much smaller than those of low shear thinning elastomer (ENGAGE 8100).

Comparisons are between examples and comparative samples where the POE has a similar melt index and similar BC load.

When Examples 1-3 with BSA1.1 ($I_2$=1.1) are compared to Comparative Samples 1-4 (ENGAGE 8100 $I_2$=1.0), Examples 1-3 show Da values 1025-1165 nm compared to 1836-2504 nm for Comparative Samples 2-4. Examples 1-3 also have improved impact strength (363.8-502.0 J/m) compared to the impact strength for Comparative Samples 2-4 (90.7-180.3 J/m).

Example 4 (BSA7.6, $I_2$=6.8) has a smaller particles size, Da=766 nm, and greater impact strength, 1793 J/m, compared to Comparative Sample 6 (ENGAGE 8200, $I_2$=4.9) with a particle size, Da=1388 nm, and an impact strength of 164 J/m.

The compositions of the present disclosure containing greater than or equal to 3.0 wt % BSA-modified POE show lower haze values when compared to compositions with an un-modified POE component. Examples 1-3 show lower haze values 58.50-66.10% compared to the haze values for Comparative Samples 2-4, 94.62-96.04%. Example 4 shows a lower haze value 56.68% compared to Comparative Sample 6 70.22%.

The composition of the present disclosure containing greater than or equal to 3.0 wt % BSA-modified POE show interface between POE phase and the PP phase. The BSA1.1 and BSA7.6 provide a high shear thinning characteristic, enabling the BSA-modified POEs to be dispersed in the PP phase to a smaller particle size than un-modified POE.

It is specifically intended that the present disclosure not be limited to the embodiments and illustrations contained herein, but include modified forms of those embodiments including portions of the embodiments and combinations of elements of different embodiments as come within the scope of the following claims.

The invention claimed is:

1. A composition comprising:
   a) from 50 wt % to 95 wt % of a propylene homopolymer;
   b) from 3 wt % to 48 wt % of a bis(sulfonyl azide) coupled ethylene/$C_{3-20}$ α-olefin copolymer having an $I_{10}/I_2$ from greater than 7.5 to 15.0 and a density less than 0.90 g/cc; and
   c) from 2 wt % to 15 wt % of a block composite comprising
      (i) a soft copolymer comprising propylene and greater than 10 mol % ethylene,
      (ii) a hard polymer comprising greater than 90 mol % propylene,
      (iii) a diblock copolymer having a soft segment and a hard segment, wherein the soft segment is the same as the soft copolymer and the hard segment is the same as the hard polymer.

2. The composition of claim 1 wherein the propylene homopolymer has a melt flow rate from 10 g/10 min to 100 g/10 min.

3. The composition of claim 1 comprising
   a) from 65 wt % to 75 wt % propylene homopolymer;
   b) from 20 wt % to 25 wt % of a bis(sulfonyl azide) coupled ethylene/$C_{3-20}$ α-olefin copolymer having an $I_{10}/I_2$ from 8.0 to 15.0;
   c) from 3 wt % to 15 wt % of the block composite; and the composition has an Izod dart impact strength from 350 J/m to 550 J/m at 23° C. as measured in accordance with ASTM 256-10.

4. The composition of claim 3 wherein the bis(sulfonyl azide) coupled ethylene/$C_{3-20}$ α-olefin copolymer has an $I_{10}/I_2$ from 10.0 to 15.0.

5. The composition of claim 3 having a haze value from 55% to 70%.

6. The composition of claim 3 having a flexural modulus from 1000 MPa to 2000 MPa.

7. The composition of claim 3 wherein the bis(sulfonyl azide) coupled ethylene/$C_{3-20}$ α-olefin copolymer has an $I_{10}/I_2$ of 12.4.

8. The composition of claim 1 comprising a filler.

9. The composition of claim 1 comprising
   a) from 65 wt % to 75 wt % propylene homopolymer;
   b) from 20 wt % to 25 wt % of a bis(sulfonyl azide) coupled ethylene/$C_{3-20}$ α-olefin copolymer having an $I_{10}/I_2$ from 8.0 to less than 10.0;
   c) from 3 wt % to 15 wt % of the block composite; and
   the composition has an Izod dart impact strength from 100 J/m to 200 J/m at 23° C. as measured in accordance with ASTM 256-10.

10. The composition of claim 9 wherein the bis(sulfonyl azide) coupled ethylene/$C_{3-20}$ α-olefin copolymer polyolefin elastomer has an $I_{10}/I_2$ of 8.5.

11. The composition of claim 9 having a haze value from 55% to 70%.

12. The composition of claim 9 having a flexural modulus from 900 MPa to less than 1000 MPa.

13. The composition of claim 9 comprising a filler.

14. The composition of claim 5 wherein the bis(sulfonyl azide) coupled ethylene/$C_{3-20}$ α-olefin copolymer has an Area Weighted Average Diameter, Da, from 1025 nm to 1165 nm.

15. The composition of claim 11 wherein the bis(sulfonyl azide) coupled ethylene/$C_{3-20}$ α-olefin copolymer has an Area Weighted Average Diameter, Da, from 1025 nm to 1165 nm.

16. The composition of claim 1 wherein the ethylene/$C_{3-20}$ α-olefin copolymer is an ethylene/octene copolymer.

17. The composition of claim 1 wherein the ethylene/$C_{3-20}$ α-olefin copolymer has a density from 0.855 g/cc to 0.880 g/cc.

* * * * *